(12) United States Patent
Stiesdal

(10) Patent No.: US 8,975,795 B2
(45) Date of Patent: Mar. 10, 2015

(54) ELECTRIC GENERATOR

(75) Inventor: Henrik Stiesdal, Odense (DK)

(73) Assignee: Siemens Aktiengesellschaft, München (DE)

( * ) Notice: Subject to any disclaimer, the term of this patent is extended or adjusted under 35 U.S.C. 154(b) by 288 days.

(21) Appl. No.: 13/577,977

(22) PCT Filed: Aug. 3, 2010

(86) PCT No.: PCT/EP2010/061297
§ 371 (c)(1),
(2), (4) Date: Oct. 23, 2012

(87) PCT Pub. No.: WO2011/110240
PCT Pub. Date: Sep. 15, 2011

(65) Prior Publication Data
US 2013/0049504 A1    Feb. 28, 2013

(30) Foreign Application Priority Data
Mar. 12, 2010  (EP) .................... 10156310

(51) Int. Cl.
| H02K 3/51 | (2006.01) |
| H02K 15/14 | (2006.01) |
| H02K 5/10 | (2006.01) |
| F03D 9/00 | (2006.01) |
| H02K 3/50 | (2006.01) |
| H02K 7/18 | (2006.01) |

(52) U.S. Cl.
CPC ................. H02K 5/10 (2013.01); H02K 15/14 (2013.01); H02K 3/51 (2013.01); F03D 9/002 (2013.01); *H02K 3/505* (2013.01); *H02K 7/1838* (2013.01); *Y02E 10/725* (2013.01)
USPC ................... 310/89; 310/58; 310/59; 310/77; 290/43; 290/44; 290/54; 290/55

(58) Field of Classification Search
CPC ............. H02K 3/40; H02K 3/42; H02K 3/51; H02K 3/505; H02K 5/14
USPC ............................ 290/43, 44, 54, 55; 310/89
See application file for complete search history.

(56) References Cited

U.S. PATENT DOCUMENTS

| 4,766,337 A * | 8/1988 | Parkinson et al. ............... 310/58 |
| 7,431,567 B1 | 10/2008 | Bevington |
| 7,462,964 B2 * | 12/2008 | Nagayama et al. ............. 310/58 |
| 2002/0180305 A1 | 12/2002 | Picech et al. |
| 2009/0026771 A1 * | 1/2009 | Bevington et al. .............. 290/55 |

FOREIGN PATENT DOCUMENTS

| CN | 101615817 A | 12/2009 |
| DE | 907791 C | 3/1954 |
| DE | 19542021 A1 | 5/1997 |
| EP | 0288328 A1 | 10/1988 |

* cited by examiner

*Primary Examiner* — John K Kim
*Assistant Examiner* — Rashad Johnson

(57) ABSTRACT

Electric generator is disclosed having a stator and a rotor. The rotor being rotatable around a center axis and relatively to the stator and the stator includes a number of stator windings extending in freely exposed end windings. The stator and/or the rotor is provided with at least one barrier means which barrier means axially extends to such a manner that at least the end windings of the stator are at least partially covered.

11 Claims, 7 Drawing Sheets

ELECTRIC GENERATOR

CROSS REFERENCE TO RELATED APPLICATIONS

This application is the US National Stage of International Application No. PCT/EP2010/061297, filed Aug. 3, 2010 and claims the benefit thereof. The International Application claims the benefits of European application No. 10156310.4 EP filed Mar. 12, 2010. All of the applications are incorporated by reference herein in their entirety.

FIELD OF INVENTION

The invention relates to a generator for an electrical machine having a stator and a rotor, with the rotor being rotatable around a centre axis and relatively to the stator and the stator comprising a number of stator windings extending in freely exposed end windings.

BACKGROUND OF INVENTION

Generators are well known and convert mechanical energy to electrical energy. They usually comprise a stator and a rotor, with the rotor being rotatable around a centre axis and relatively to the stator and the stator comprising a number of stator windings axially and/or radially extending in freely exposed end windings.

A specific field of use for generators is represented by wind power plants, that is wind turbines which transfer wind energy into electrical power. Modern direct drive large scaled wind turbines comprise huge generators, whereby the dimensions of the generators allow a worker to enter the inner range of the generator particularly in terms of maintenance and repair for instance both being necessary and ongoing activities in generators.

SUMMARY OF INVENTION

A particular problem during maintenance of a generator arises from objects unintentionally slid by maintenance personal working inside the generator. Thereby, falling items like tools or the like may hit and damage essential parts of the generator. Particular sensitive areas in a generator comprise the end windings of the stator windings since the sensitive end windings are freely exposed and vulnerable to damage.

US 2002/0180305 A1 discloses an electrical machine with a stator and a rotor. Thereby, the rotor windings are arranged in correspondingly formed slots of the rotor, which rotor windings form a rotor end winding at each end of the rotor. The rotor end windings are enclosed by a rotor end bell which serves to protect the rotor end windings from damage. For assembly, the rotor end bells are axially shrink-fitted on the ends of the rotor body. This assembly method is cumbersome and cost-intensive. Still, the end windings of the stator may easily be damaged.

It is an object of the invention to provide a generator having a protection against damage of the end windings of the stator, particularly caused by falling items.

This is achieved by a generator as described above, wherein the stator and/or the rotor is provided with at least one barrier means which barrier means axially extends to such a manner that at least the end windings of the stator are at least partially covered.

The invention provides a constructively simple, yet secure and cost-effective way to protect the sensitive end windings of the stator windings of the stator of a generator without the need of complex constructive measures for protecting the end windings since the inventive principle emanates from the idea to provide at least one barrier means building a mechanical barrier in order to prevent any damage of any axially and/or radially extending end windings. This is obtained by at least partially covering or shielding of the end windings by means of the barrier means which may be provided with the stator and/or the rotor. Hence, a secure protection of the end windings particularly against unintentionally falling items or the like is given in such a manner that these items hit the barrier means and not the end windings. The inventive barrier means may be used for outer stator—inner rotor and inner stator—outer rotor configurations of the generator, respectively.

Thereby, the barrier means preferably comprises at least one baffle. The baffle is mechanical strong enough to protect the end windings from falling items and to withstand all possible conditions which may occur during operation of the generator particularly in view of temperature. The baffle may be made from a non-magnetic metal like austenitic steel for instance. Of course other materials are applicable as well.

It is preferred, that the stator and the rotor comprise separate barrier means axially extending towards each other. In this case different embodiments are thinkable as set forth in the following.

Thereby, it is possible that barrier means are disposed at radially different or similar positions. The radial position of a barrier means is substantially defined by its distance to the centre axis of the generator. Hence, radially different positions means that the barrier means of the rotor has a different distance to the centre axis than the barrier means of the stator. Accordingly, same radial positions means that the respective barrier means are equidistantly disposed with respect to the centre axis. As a rule, every radial position is possible which is constructively feasible.

Further, it is possible that the barrier means differ in their length or have the same length. As a rule, the length of the barrier means, i.e. its axial dimension is predominantly limited by the axial gap between the rotor and the stator. Further, the length of the barrier means are determined so that there is no possibility of a contact of the free endings of the barrier means in particular when the barrier means are disposed at radially similar positions. The length of the barrier means, that is their axial extension assure that falling items may not hit the end windings, but fall on the barrier means where they are kept.

Thus, it is thinkable that the barrier means are disposed at radially similar positions, whereby a small gap is built between the free endings of the barrier means. Thereby, the gap may be built for barrier means having the same or different lengths in equal measure. The gap prevents the barrier means from contacting each other. Aside, the dimension of the gap is in such a manner that no item may pass the gap, that is fall or slide through the gap which would possibly lead to a damaging of the end windings of the stator.

It is of further advantage, when the barrier means are overlapping. An overlap may be built when the barrier means are disposed at radially different positions. In this embodiment the barrier means differ in their lengths, whereby one barrier means axially extends over the other thereby building an overlapping region assuring that no item may hit the end windings. An overlap may also be built when the barrier means are disposed at radially equal positions. In this embodiment the free endings of the barrier means are shaped in such a manner that on the one hand an overlap is built while on the other hand a direct contact of the respective free ends is not possible. Hence, the free ends of the barrier means may comprise according step-like rebates, inclinations or bevellings or the like. In this case, the lengths of the barrier means may be equal or may differ.

The barrier means may project from a radially extending end plate of the stator and/or the rotor. That is, the barrier means are preferably detachably attached to the respective end plates of the stator and/or the rotor by appropriate connecting means such as screws, bolts or the like for instance. A detachable connection is of advantage in particular to allow an access to the end windings or in terms of replacement of the barrier means. Likewise, a non-detachable connection of the barrier means and the respective end plates may be accomplished by welding or adhesive bonding for instance.

Thereby, the barrier means favourably axially extends off the generator if it projects from an end plate of the stator and the barrier means extends axially towards the stator if it projects from an end plate of the rotor. In such a manner, the barrier means disposed at the end plate of the rotor projects towards the end windings and the barrier means disposed at the end plate of the stator projects off the generator. In both cases the barrier means sufficiently covers the end windings so as to provide a proper protection against items falling down. It is understood, that in the particular case of only one barrier means projecting from the rotor end plate a small gap must be given between the barrier means and the stator end plate so as to avoid a direct contact of the barrier means provided with the rotating end plate of the rotor and the end plate of the stator.

The barrier means preferably has a hollow cylindrical shape. The hollow cylindrical shape may be particularly a ring-shape or any other shape based on a body of revolution when the barrier means is disposed with a rotating part of the generator since in such a manner the rotating behaviour is not negatively affected. Anyhow, the barrier means may generally comprise other shapes like rectangular, square or polygon shapes for instance as long as they surround the end windings as well.

In a further embodiment of the invention, the barrier means is segmented in at least two parts. A segmentation of the barrier means is of advantage since it contributes to an access to the end windings in terms of inspection of the end windings for instance. Further, transport and assembling of the barrier means is eased. The number of segments may differ. A segmentation may be provided in axial direction with respect to the centre axis, that is the barrier means comprises a number of separate axially disposed members being connectable so as to build the barrier means and/or with respect to a top view on the barrier means a segmentation is also possible in circumferential direction of the stator.

Aside, the barrier means may have an aerodynamic shape so as to conduct air through the generator. In such a manner, the barrier means comprise an additional function contributing to a concertedly and guided air stream through the generator which improves the cooling behaviour of the generator as a whole. There may be further cooling means like cooling channels, cooling ribs or the like integrated in or provided with the barrier means, which are connected to a cooling system of the generator if need be.

The free end of the barrier means may comprise a fold, flange or may be bent so as to keep falling items securely disposed on the barrier means in such a manner that personal inside the generator may collect items from the baffle. In such a way, fallen items are more securely disposed on the barrier means. Thus, the barrier means may have a L-shaped longitudinal section, whereby the long leg extends in axial and the short leg extends in radial direction, that is extends towards the inside of the generator.

The invention further relates to a wind turbine comprising a generator as described above.

BRIEF DESCRIPTION OF THE DRAWINGS

In the following the invention is described in detail as reference is made to the figures, whereby.

DETAILED DESCRIPTION OF INVENTION

Figure 1:
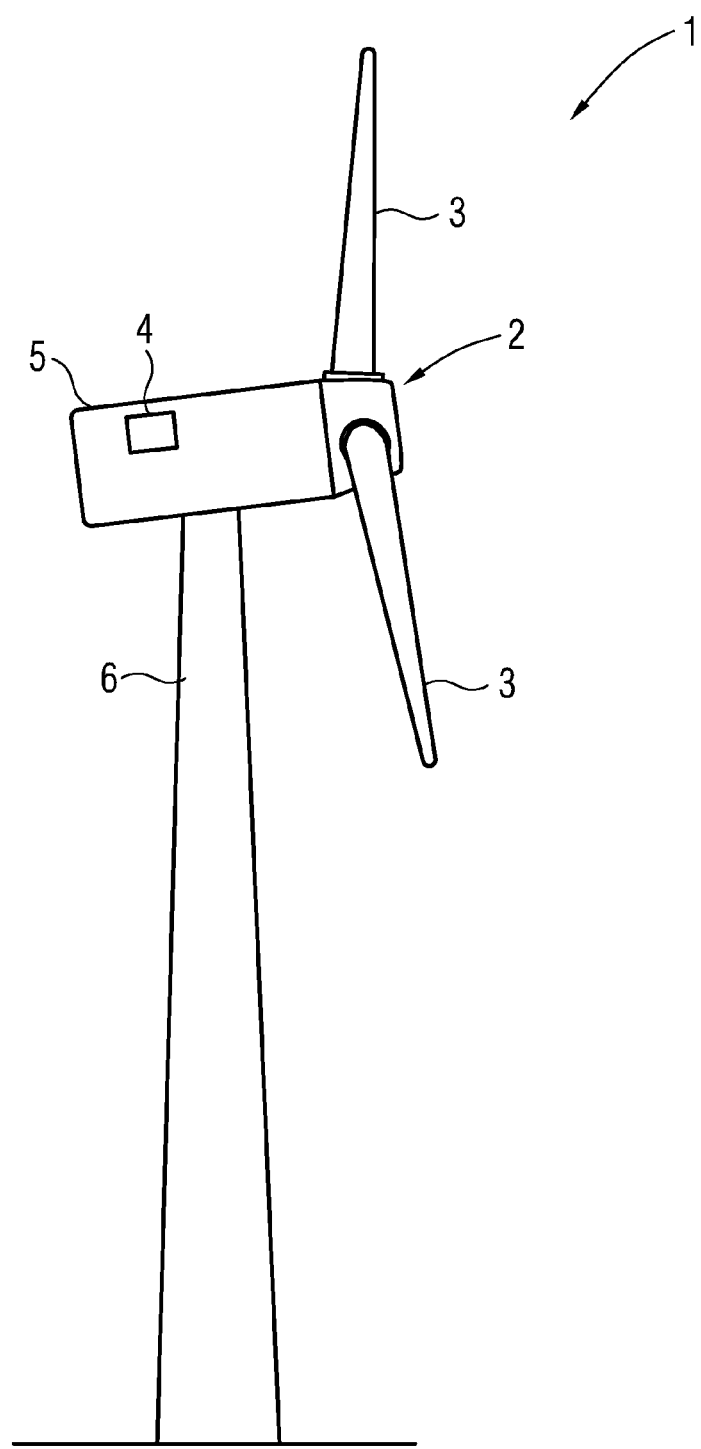
FIG. 1 shows a schematic view of a wind turbine according to an exemplary embodiment of the invention.

FIG. 1 shows a schematic view of a wind turbine 1 according to an exemplary embodiment of the invention. The wind turbine 1 is a direct-drive wind turbine having a reduced number of components as it particularly does not comprise a gear box. Direct-drive wind turbines have a direct mechanical coupling between the wind rotor hub 2 having a number of blades 3 attached to it and a power generating unit in form of a generator 4, so that the wind drives the blades 3 and the rotor within the generator 4 together as a unit. The wind turbine 1 comprises a nacelle 5 being rotatably disposed on a tower 6. The nacelle 5 essentially accommodates all components of the wind turbine 1 which are relevant for the generation of power, that is particularly the generator 4.

In the following FIGS. 2-5 rotating parts are hatched.

Figure 2:
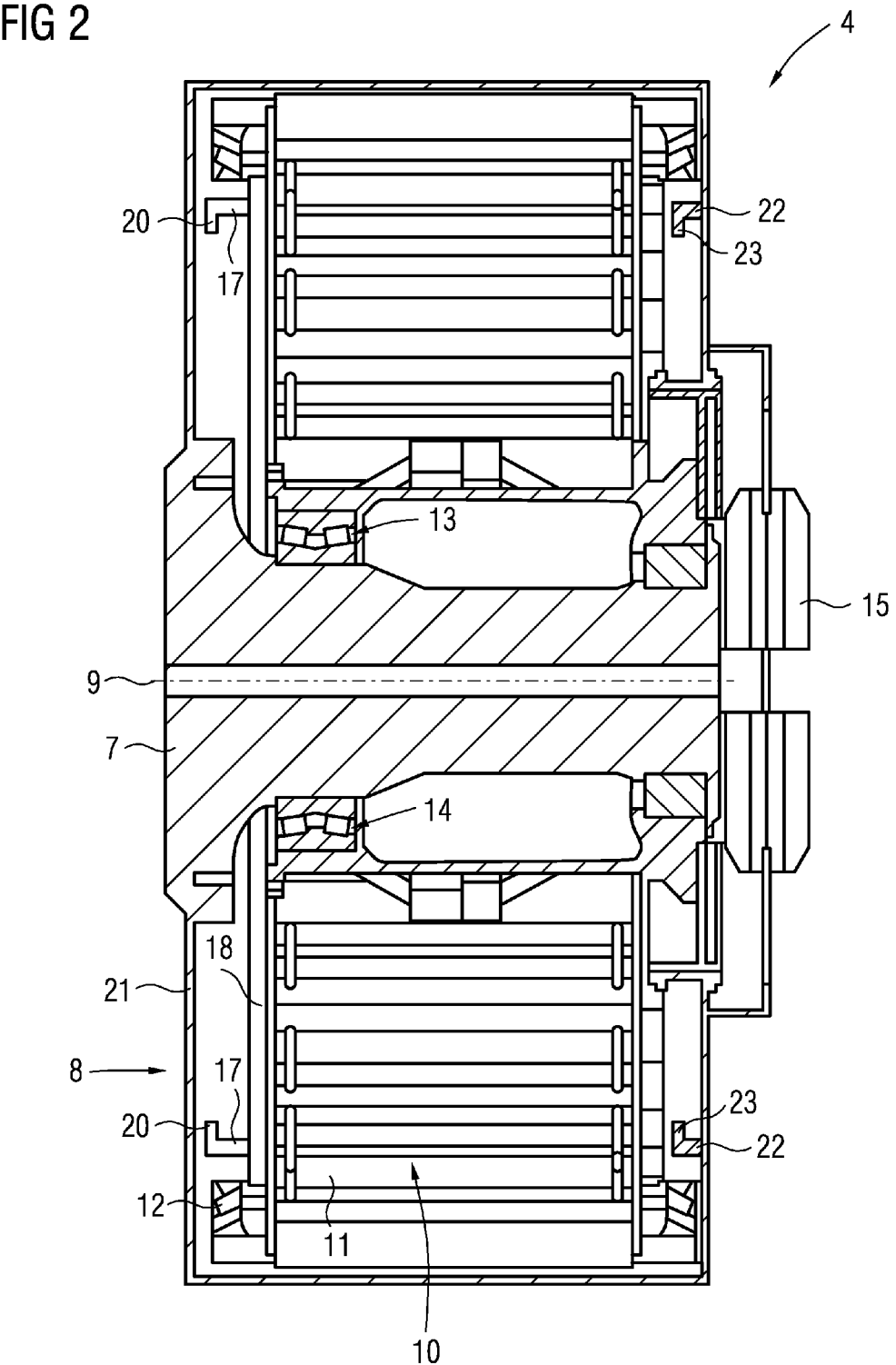
FIG. 2 shows a principle view of an inventive generator according to an exemplary embodiment of the invention.

FIG. 2 shows a generator 4 according to an exemplary embodiment of the invention, whereby only essential parts are denoted. The generator 4 comprises a rotating shaft 7 which is mechanically coupled to the rotor hub 2 (cf. FIG. 1). The rotation of the shaft 7 is transmitted to a rotor 8. Hence, the rotor 8 may rotate around the centre axis 9 and relatively to the stator 10. The stator 10 comprises a number of stator windings 11 axially extending in end windings 12. Generator bearings 13, 14 are disposed between the rotating shaft 7 and the stator 10 of the generator 4. The generator 4 further comprises a brake 15 in order to reduce or control the rotational speed of the rotating shaft 7 and hence, the rotational speed of the rotor 8.

The diameter of the inner area 16 (cf. FIG. 3-6) of the stator 10 is large enough to accommodate a worker, e. g. in terms of service and repair of the generator 4 or its components. As is discernable, the highly sensitive end windings 12 are covered by barrier means in the shape of axially extending steel baffles 17, 22 covering the end windings 12 so that in the possible case of an unintentionally falling or slid item such as a tool for example, the end windings 12 are protected against damage since the item will hit the baffle 17 and not the end windings 12. Thereby, baffle 17 is detachably attached to a radially extending stator end plate 18 by means of appropriate connecting means like screws or the like (not shown), whereas baffle 22 is welded to a radially extending rotor end plate 21.

The free ends of the baffles 17, 22 are bent to flanges 20, 23 so that the baffles 17, 22 are L-shaped in a longitudinal cut view. The flanges 20, 22 assure that an item located on the baffles 17, 22 is securely positioned and kept on the baffles 17, 22. Aside, the baffles 17, 22 have an aerodynamic shape so that an air flow is concertedly directed through the gap between the stator end plate 18 and the rotor end plate 21.

Figure 3:
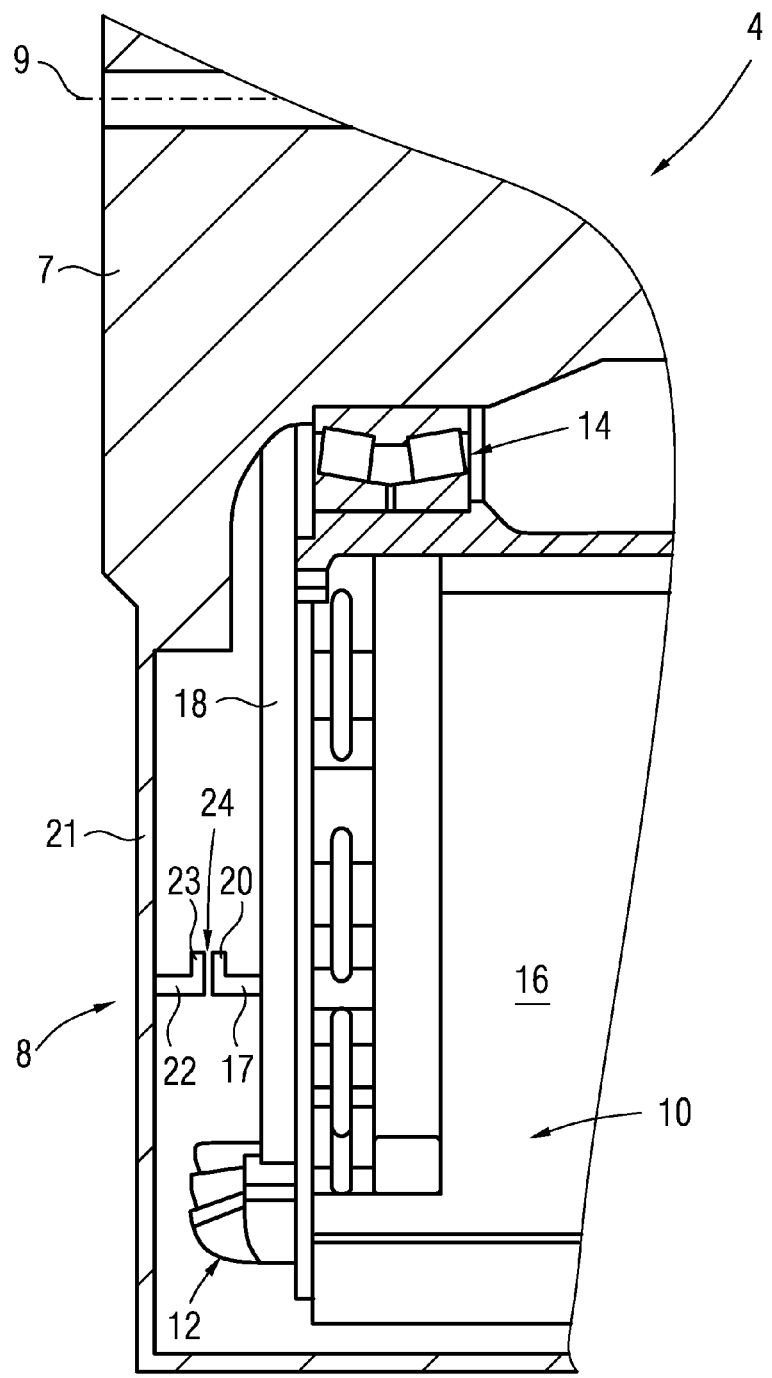
FIG. 3 shows an enlarged detail view of the lower part of a generator according to a first embodiment of the invention.

FIG. 3 shows an enlarged detail view of the lower part of a generator 4 according to a first embodiment of the invention. The essential difference to the embodiment according to FIG. 2 is that both the stator 10 and the rotor 8 comprise separate baffles 17, 22, whereby baffle 17 is provided with the stator end plate 18 and baffle 21 is provided with the rotor end plate 21. Both baffles 17, 22 are provided with flanges 20, 23 at their respective free ends. The baffles 17, 22 have the same axial length and the same radial position with respect to the centre axis 9. A small gap 24 of only a few centimetres is built between the free ends of the baffles 17, 22, yet it is impossible that falling items may pass the gap 24 and further hit and damage the end windings 12. Thus, the end windings 12 are fully protected against falling items.

Figure 4:
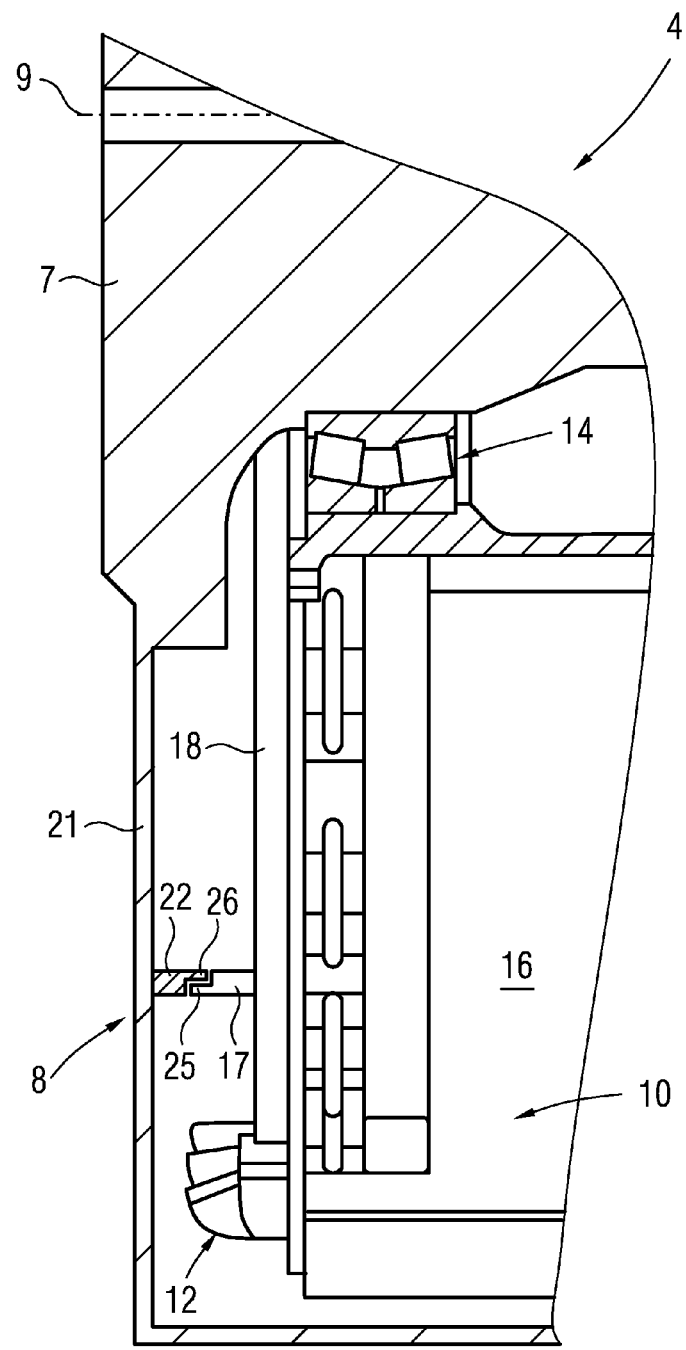
FIG. 4 shows an enlarged detail view of the lower part of the generator according to a second embodiment of the invention.
Figure 5:
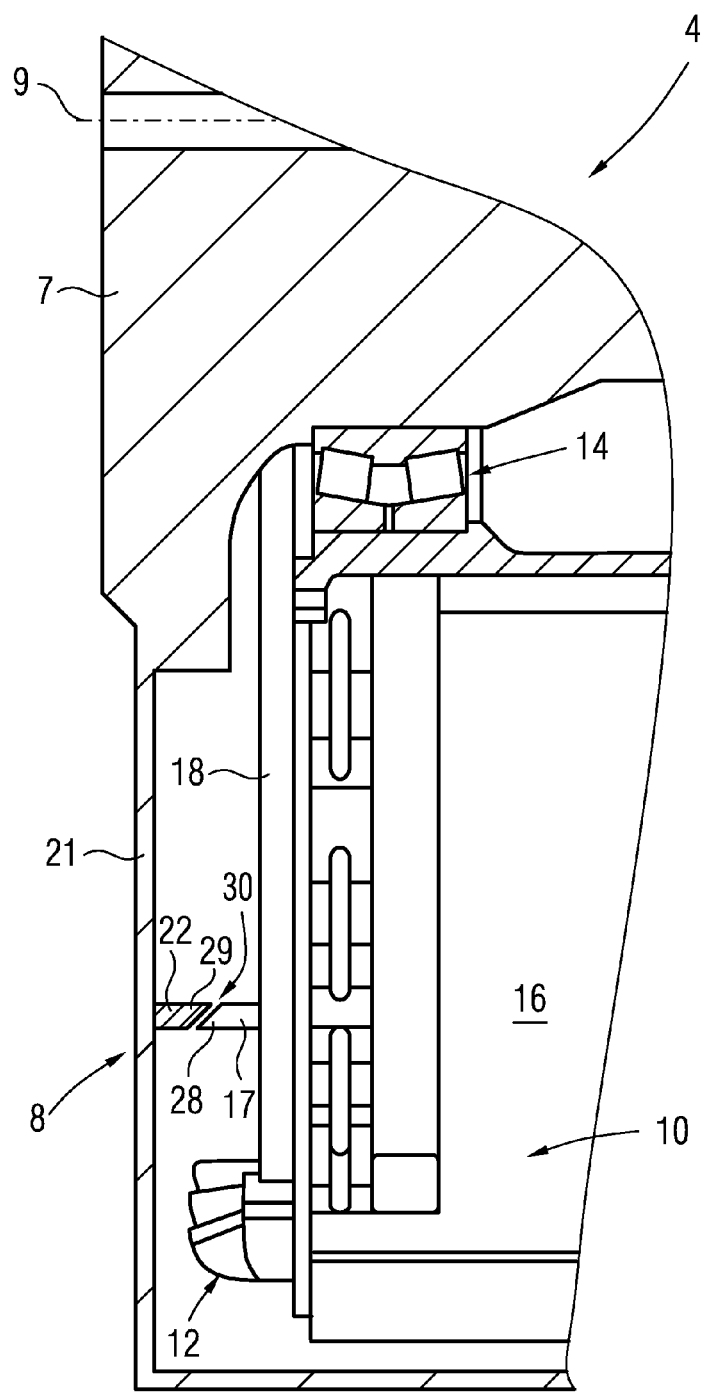
FIG. 5 shows an enlarged detail view of the lower part of a generator according to a third embodiment of the invention.

FIGS. 4, 5 show enlarged detail views of the lower part of the generator 4 according to a second and third embodiment of the invention. As is discernable, baffles 17, 22 are disposed to respective end plates 18, 21 of the stator 10 and the rotor 8. Thereby, the radial position with respect to the centre axis 9 of the baffles, 17, 22 is essentially the same.

According to FIG. 4, an overlap of the baffles 17, 22 is achieved by a specific design of the free endings of the baffles 17, 22, which comprise according step-like rebates 25, 26. It is discernable, that the baffle 17 is slightly longer than the baffle 22, so that the baffle 17 axially extends off the stator end plate 18 over the end windings 12.

A similar design of the free endings of the baffles 17, 22 is shown in FIG. 5, whereby the free endings of the baffles 17, 22 comprise corresponding inclinations 28, 29. Thereby, the gap 30 between the free endings of the baffles 22, 17 is small enough to avoid any falling item passing the gap 30.

Hence, the embodiments according to FIGS. 4, 5 assure a proper shielding of the vulnerable end windings 12 as well.

Figure 6:
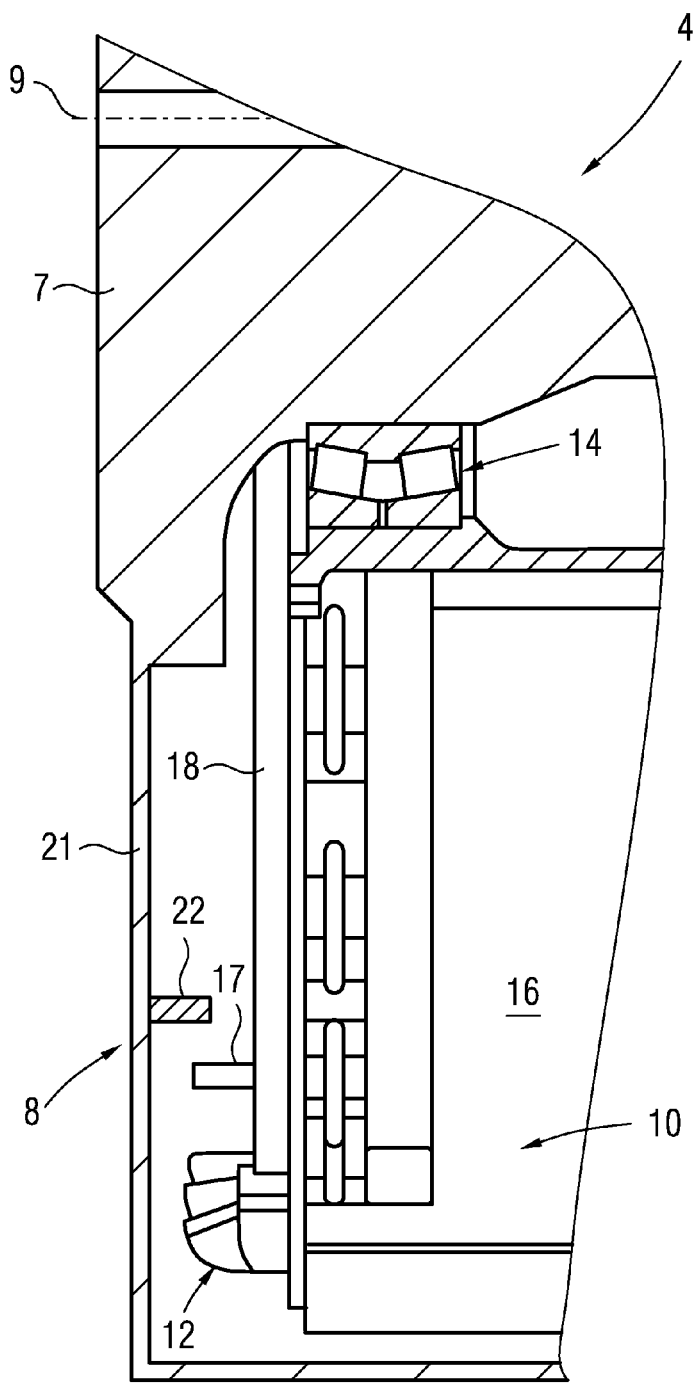
FIG. 6 shows an enlarged detail view of the lower part of a generator according to a fourth embodiment of the invention.

FIG. 6 shows an enlarged detail view of the lower part of a generator 4 according to a fourth embodiment of the invention. The essential difference to the preceding embodiments is in the radial position and the axial length of the baffles 17, 22. As is discernable, baffle 22 has a radially inward and baffle 17 a radially outward position with respect to the centre axis 9. The baffles 17, 22 are overlapping so that no gap is appearing in the radial outward projection of the generator 4 with respect to the centre axis 9. Of course, an opposite arrangement of the baffles 17, 22 would be feasible as well. Hence, the end windings 12 are protected against falling items.

Figure 7:
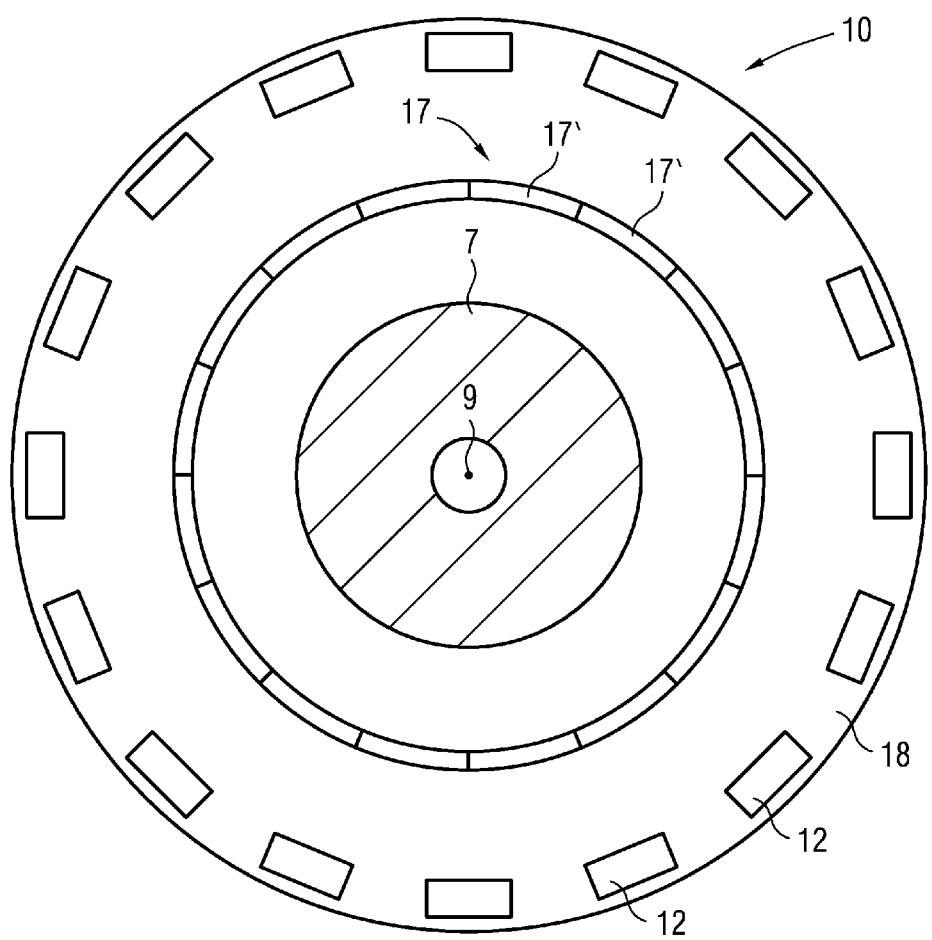
FIG. 7 shows a principle front view of the stator of a generator according to an exemplary embodiment of the invention.

FIG. 7 shows a principle front view of the stator 10 of a generator 4 according to an exemplary embodiment of the invention. As is discernable, the baffle 17 comprises a number of baffle segments 17' circumferentially disposed around the centre axis 9. Appropriate connecting means (not shown) provide a detachable connection of the baffle segments 17' so as to build a circumferentially closed essentially ring-shaped hollow cylindrical baffle 17. This embodiment is of advantage in terms of service and repair since an easy accessibility to the end windings 12 is given as each baffle segment 17' is easily removable. It is understood, that a segmentation of the barrier means, that is the baffle 22 is also applicable for the rotor 8.

The invention claimed is:

1. A generator for an electrical machine, comprising:
   a stator comprising a plurality of stator windings extending in freely exposed end windings; and
   a rotor being rotatable around a centre axis and relative to the stator,
   wherein the at least the stator or the rotor is provided with a barrier means which axially extends to such a manner that at least the end windings of the stator are at least partially covered,
   wherein the barrier means projects from a radially extending end plate of the stator or projects from a radially extending end plate of the rotor,
   wherein the barrier means extends axially off the generator when it projects from an end plate of the stator, and
   wherein the barrier means extends axially towards the stator when it projects from an end plate of the rotor.

2. The generator according to claim 1,
   wherein the stator and the rotor comprise separate barrier means axially extending towards each other.

3. The generator according to claim 2,
   wherein the barrier means are disposed at radially different or similar positions.

4. The generator according to claim 3,
   wherein the barrier means are disposed at radially similar positions, and
   wherein a small gap is built between the free endings of the barrier means.

5. The generator according to claim 3,
   wherein the barrier means are overlapping.

6. The generator according to claim 2,
   wherein the barrier means differ in their lengths or have the same length.

7. The generator according to claim 1, wherein the barrier means has a hollow cylindrical shape.

8. The generator according to claim 1,
   wherein the barrier means is segmented in at least two parts.

9. The generator according to claim 8,
   wherein the free end of the baffle comprises a fold, flange or is bent.

10. The generator according to claim 1,
    wherein the barrier means has an aerodynamic shape so as to conduct air through the generator.

11. The generator according to claim 1,
    wherein the barrier means comprises at least one baffle.

* * * * *